UNITED STATES PATENT OFFICE.

HYMAN ELI GOLDBERG, OF CHICAGO, ILLINOIS, ASSIGNOR OF ONE-HALF TO ROBERT P. LAMONT, OF CHICAGO, ILLINOIS.

CONDUCTIVE INK.

1,034,103. Specification of Letters Patent. Patented July 30, 1912.

No Drawing. Application filed October 28, 1910. Serial No. 589,565.

*To all whom it may concern:*

Be it known that I, HYMAN ELI GOLDBERG, a citizen of the United States, residing at Chicago, in the county of Cook and State of Illinois, have invented a certain new and useful Conductive Ink, of which the following is a specification.

My invention relates to the production of an electrically conductive ink, particularly one which when applied to paper, for example by an ordinary writing pen, and dry can be used to conduct electricity along the characters thus formed upon the paper. I have discovered that an ink of this character can be produced in a manner illustrated by the following example: A quantity of deflocculated Acheson graphite, a product well known in the trade, is mixed with a proper amount of water or other volatile liquid to make the mixture flow freely, as an ordinary ink should, and to this mixture is preferably added a small proportion of gelatin, usually simply a drop or two, to increase the adhesive properties of the ink. The ink thus obtained is used in the ordinary way in writing, and when the marks upon the paper are dry and electric wires or other terminals are applied to different portions of the mark or line electric current will pass along the line from one terminal to the other.

Attention is directed to my patent No. 1,034,104 granted this day July 30, 1912, in which is disclosed an ink having similar properties and including colloidal graphite as one of its component elements.

Having thus described my invention what I claim as new and desire to secure by Letters Patent is:—

1. A visible writing ink forming a good electric conductor when dry, said ink including as one of its ingredients deflocculated graphite.

2. A visible ink made of deflocculated graphite diluted with a volatile liquid.

In witness whereof, I have hereunto subscribed my name in the presence of two witnesses.

HYMAN ELI GOLDBERG.

Witnesses:
DWIGHT B. CHEEVER,
MARGARET D. ROBB.